(No Model.)

C. W. HEISLEY.
CRANBERRY REAPER AND DETACHER.

No. 258,754. Patented May 30, 1882.

WITNESSES:
W. Bugbee Smith
Fredk. G. Snow

INVENTOR
Charles W. Heisley

ATTORNEY

UNITED STATES PATENT OFFICE.

CHARLES W. HEISLEY, OF TUCKAHOE, NEW JERSEY.

CRANBERRY REAPER AND DETACHER.

SPECIFICATION forming part of Letters Patent No. 258,754, dated May 30, 1882.

Application filed February 28, 1882. (No model.)

*To all whom it may concern:*

Be it known that I, CHARLES WESLEY HEISLEY, a citizen of the United States, residing at Tuckahoe, in the county of Cape May and State of New Jersey, have invented a new and useful Cranberry-Gathering Machine, of which the following is a specification.

My invention relates to improvements in cranberry-gathering machines in which a system of horizontal troughs operate in conjunction with cross-bars or reapers; and the objects of my improvements are, first, to provide for the introduction of the vines and their fruit into the machine; second, to afford facilities for gathering the fruit; and, third, to dismiss the vines while retaining the fruit in the machine. I attain these objects by the mechanism illustrated in the accompanying drawings, in which—

Figure 1:
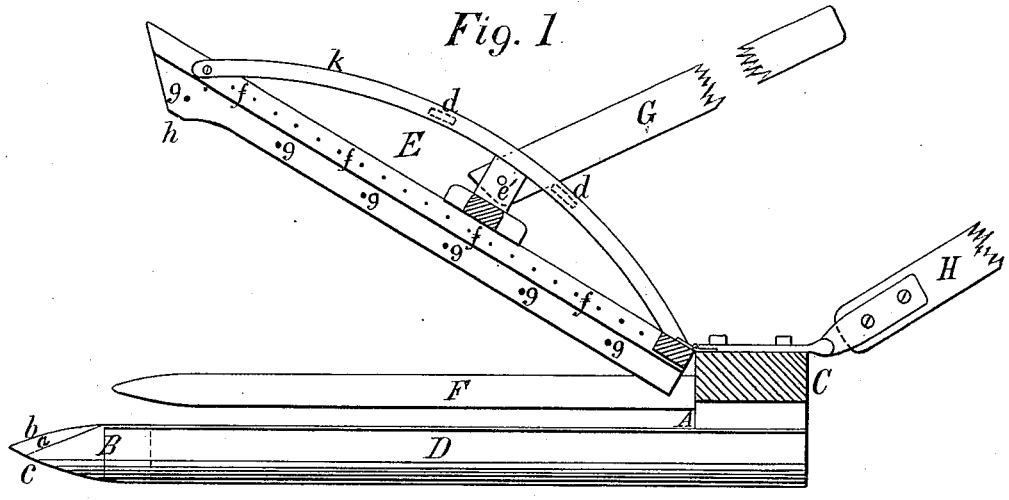
Figure 2:
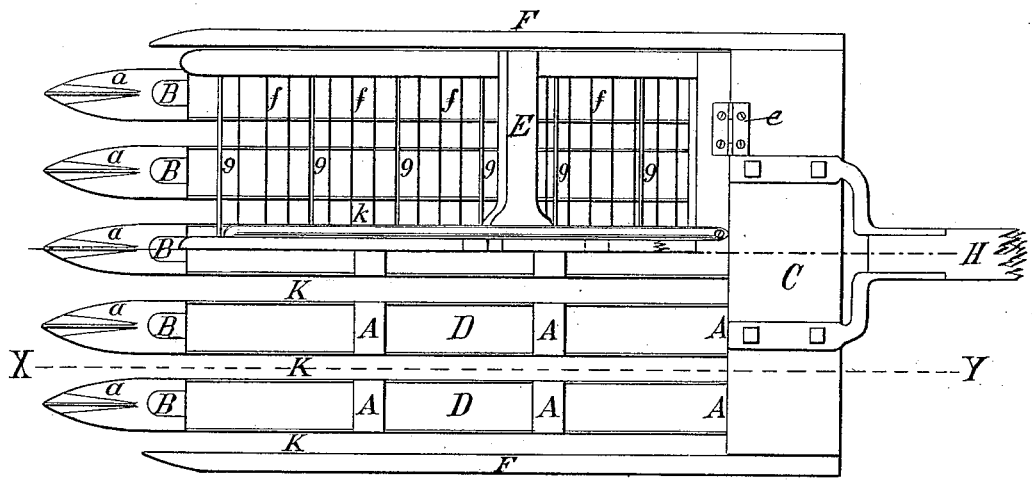

Figure 1 is a vertical section of the entire machine. Fig. 2 is a top view of the machine as it appears with half the lid presented.

Similar letters refer to similar parts throughout the several views.

The troughs D, fenders or sides F, the base C, to which the troughs, fenders, and lid are fixed, and the lid E constitute the frame-work of the machine. The heads B of the troughs are pointed at $b$, to separate the vines on either side, and are beveled at $c$ to bear the vines under the troughs, and have the ledge or shoulder $a$ on either side to carry the berries backward and upward into the upper and open side of the troughs into which they are to fall. The sub-reapers A across the insides of the tops of the several troughs, and the reapers $g$, extending across the machine directly above the sub-reapers, are to detach the berries from the vines as the machine is thrust into or withdrawn through the vines. The spaces K between the troughs, extending their entire length and under the base, are designed for the passage of the vines.

To the lid E, which falls within the fenders or sides F, the cross bars or reapers $g$ are attached, as are also the cross bars or wires $f$, which together constitute the inclosure of the lid and with the sides of the lid afford facility for jarring the berries from their vines by downward concussion. The hinges $e$ attach the lid to the base C, and the automatic handle G affords facility to open and shut the machine in thrusting or withdrawing the machine and to effect the concussion by the hand of the operator by which the berries not reaped may be detached into the troughs. $e'$ is its hinge, $h$ its traverse, and $d\ d$ its fulcrums. The handle or helve of the machine H is attached to the base C, and affords facility for working the machine from the rear. The conformation of the whole is that of a covered scoop, and is designed to be operated in a similar manner thereto.

What I claim as my invention, and desire to secure by Letters Patent, is—

1. In a cranberry-gathering machine, the troughs D, each having a head, B, beveled at $c$, and provided with a point, $b$, and ledges or shoulders $a$, as described and shown, and for the purposes set forth.

2. In a cranberry-gathering machine, the combination of troughs D, reapers A, and auxiliary reapers $g$, substantially as described and shown.

3. In a cranberry-gathering machine, the hinged lid E, provided with reapers $g$, cross-bars $f$, and a handle, G, combined substantially as specified.

4. In a cranberry-gathering machine, the troughs D, separated from each other by spaces K, in combination with the sides or fenders F, substantially as and for the purposes set forth.

CHARLES W. HEISLEY.

Witnesses:
 WM. A. HUSTED,
 JEHU EVANS.